US007257201B2

(12) United States Patent
Singh et al.

(10) Patent No.: US 7,257,201 B2
(45) Date of Patent: Aug. 14, 2007

(54) SYSTEM AND METHOD FOR UNIFIED MESSAGING IN INTER/INTRANET TELEPHONY

(75) Inventors: Kundan Singh, New York, NY (US); Henning Schulzrinne, New York, NY (US)

(73) Assignee: The Trustees of Columbia University in the City Of New York, New York, NY (US)

( * ) Notice: Subject to any disclaimer, the term of this patent is extended or adjusted under 35 U.S.C. 154(b) by 722 days.

(21) Appl. No.: 10/333,352

(22) PCT Filed: Aug. 13, 2001

(86) PCT No.: PCT/US01/41694

§ 371 (c)(1),
(2), (4) Date: May 5, 2003

(87) PCT Pub. No.: WO02/15551

PCT Pub. Date: Feb. 21, 2002

(65) Prior Publication Data

US 2003/0165231 A1 Sep. 4, 2003

Related U.S. Application Data

(60) Provisional application No. 60/224,332, filed on Aug. 11, 2000.

(51) Int. Cl.
*H04M 11/00* (2006.01)
*H04M 1/64* (2006.01)
*H04L 12/66* (2006.01)
*G06F 15/16* (2006.01)

(52) U.S. Cl. .............................. 379/88.13; 379/88.17; 370/356; 709/227

(58) Field of Classification Search ............................... 379/201.01–201.05, 201.12, 207.02, 211.01, 379/211.02, 88.01–88.28, 67.1; 709/205, 709/227; 719/311, 318, 328; 370/352–356
See application file for complete search history.

(56) References Cited

U.S. PATENT DOCUMENTS 6,011,579 A 1/2000 Newlin (Continued)

OTHER PUBLICATIONS

Kelly Carroll, "Internet Boosts Unified Messaging: Wireless Carriers Turn to Web- Based Systems," Telephony Online, Apr. 24, 2000.

(Continued)

*Primary Examiner*—Benny Q Tieu
(74) *Attorney, Agent, or Firm*—Baker Botts L.L.P.

(57) ABSTRACT

A network telephony system is provided which enables unified messaging services. The system generally includes at least one user agent (102,104) operatively coupled to a data network (106) and a signalling server operatively coupled to the data network (106). The user agents (102,104) are telephony endpoints, such as standalone Internet telephony appliances or personal computers with appropriate telephony software. A messaging server (110) is provided which is operatively coupled to the data network (106) and is responsive to the signaling server (108). The system also includes a media server (112A,112B) which is operatively coupled to the network and includes computer data storage media for storing message files. The media server is responsive to the messaging server (110) and, on occurrence of a message condition, is directly accessible to a calling party to store a message file for subsequent retrieval by a called party.

51 Claims, 5 Drawing Sheets

U.S. PATENT DOCUMENTS

| | | | |
|---|---|---|---|
| 6,075,796 | A | 6/2000 | Katseff et al. |
| 6,434,143 | B1 | 8/2002 | Donovan |
| 6,529,501 | B1 | 3/2003 | Zhao et al. |
| 6,597,686 | B1 | 7/2003 | Smyk |
| 6,625,258 | B1* | 9/2003 | Ram et al. ............... 379/88.13 |
| 6,690,663 | B1 | 2/2004 | Culver |
| 6,763,020 | B1 | 7/2004 | Hon |
| 2002/0049817 | A1* | 4/2002 | Drory et al. ................ 709/206 |
| 2003/0055974 | A1* | 3/2003 | Brophy et al. .............. 709/227 |

OTHER PUBLICATIONS

"'Killer App' Is On The Loose: Unified Messaging Is A Key Service Enabled By The Next-Generation Network," Communication News, Jan. 2000.

Leonard Chong et al., "Towards a Unified Messaging Environment Over the Internet," Cybernetics and Systems, Sep. 1999.

Brian Quinton, "Microsoft, Sprint Offer Unified Messaging Product," Telephony Online, Jun. 14, 1999.

Richard Tarabour et al., "Manageable Messages," Telephony Online, Jun. 7, 1999.

Peter Wilson, "Packet Network Proof," Telephony Online, Mar. 22, 1999.

R. Babbage et al., "Internet Phone—Changing the Telephony Paradigm," Internet and Beyond 231 (eds. S. Sim & J. Davies, 1998).

Susan Biagi, "IP Networks Now and Forever: Carriers Must Bridge Packet, Circuit-Switched Networks," Telephony Online, Oct. 12, 1998.

* cited by examiner

FIG. 3

```xml
<?xml version="1.0" ?>
<!DOCTYPE cpl SYSTEM "cpl.dtd">

<cpl>
 <subaction id="voicemail">
  <location url=
    "sip:bob@vm.cs.columbia.edu">
   <redirect />
  </location>
 </subaction>

<incoming>
  <address-switch field="origin"
      subfield="host">
   <address
      subdomain-of="cs.columbia.edu">
    <location url=
      "sip:bob@sbb.cs.columbia.edu">
     <proxy>
      <busy>
       <sub ref="voicemail" />
      </busy>
      <noanswer>
       <sub ref="voicemail" />
      </noanswer>
      <failure>
       <sub ref="voicemail" />
      </failure>
     </proxy>
    </location>
   </address>
   <otherwise>
    <sub ref="voicemail" />
   </otherwise>
  </address-switch>
 </incoming>
</cpl>
```

SYSTEM AND METHOD FOR UNIFIED MESSAGING IN INTER/INTRANET TELEPHONY

SPECIFICATION

This application claims the benefit of U.S. Provisional Application, Ser. No. 60/224,332, entitled UNIFIED MESSAGING USING SIP AND RTSP, which was filed on Aug. 11, 2000, the disclosure of which is hereby incorporated by reference in its entirety.

FIELD OF THE INVENTION

The present invention relates generally to the field of Internet and intranet telephony and more particularly relates to a network telecommunications system for performing unified messaging services.

BACKGROUND OF THE INVENTION

The Internet has evolved into an essential communication tool for millions of users in the business, technical and educational fields. In this regard, a growing use of the Internet relates to Internet telephony which provides a number of advantages over conventional circuit-switched network controlled by a separate signaling network.

An important feature in most modern telephony systems is voice messaging. An extension of voice messaging is unified messaging, where access to messaging services in various media is provided in a common platform. For example, the ability to converge voice mail, e-mail, video messaging, instant messaging services and the like within a common system as part of the telephony network provides a single platform for users to conveniently access such services.

Voicemail service is generally provided by the local private branch exchange (PBX) or local exchange carrier. Such current voice mail systems are typically closed architectures. As a result, it is often difficult to perform simple operations, such as forwarding voicemail outside the local PBX, filtering or sorting of messages. Thus, an open architecture which facilitates simple data exchange within and without of the local telephony exchange would be desirable.

The session initiation protocol (SIP) is gaining in popularity as a standard signaling protocol for use in Internet telephony. As this popularity grows, it would be desirable to provide a system architecture and method for providing unified messaging services on a SIP based system. In addition, the real time streaming protocol (RTSP) has been proposed as a standard transport protocol for multimedia service, such as video, audio and mixed media files, over the Internet. A unified messaging system which employs SIP as the signaling protocol along with RTSP for message storage and delivery can offer many benefits over known messaging systems.

SUMMARY OF THE INVENTION

In accordance with the present invention, a network telephony system is provided which enables unified messaging services. The system generally includes a data network, at least one user agent operatively coupled to the data network and a signaling server operatively coupled to the data network. The user agents are telephony endpoints, such as standalone Internet telephony appliances or personal computers with appropriate telephony software. A messaging server is provided which is operatively coupled to the data network and is responsive to the signaling server. The system also includes a media server which is operatively coupled to the network and includes computer data storage media for storing message files. The media server is responsive to the messaging server and, on occurrence of a message condition, is directly accessible to a calling party to receive a recorded message file on the media server or to store a message file for subsequent retrieval by a called party.

Preferably, the signaling server includes a database of network addresses, such as session initiation protocol (SIP) addresses, for registered user agents. On receipt of a call request from a calling party, the signaling server generates a call request to the address of the called user agent stored in the database and also generates a call request to a network address of the messaging server. The signaling server can cancel the call request to the messaging server in the event the call request to the called user agent is accepted. The signaling server can also cancel the call request to the called user agent in the event a message condition is detected. One such message condition is the passage of a predetermined time period from the initiation of the call request.

In one embodiment, after a message condition is detected, an invite request can be provided to the called user agent address while a message is being provided to the media server. By accepting the invite request, the called user agent can reclaim the call from the media server.

When a message condition is detected, the media server provides a stored greeting message to the calling party as a prompt to leave a message. The media server preferably supports streaming media and operates in accordance with the real time streaming media protocol (RTSP). In response to a calling party storing a message on the media server, the media server can also provide a notification to a called party that a message is available. The notification can take the form of an electronic mail transmission which includes the address where the called party can retrieve the message. Alternatively, the notification can include a copy of the message as a file attachment.

An alternate embodiment in accordance with the present invention is a network telephony system providing unified messaging services which includes at least two media servers distributed within the system and operating in response to a single messaging server.

Another network telephony system providing unified messaging services in accordance with the present invention includes a digital data network and a gateway server computer interposed between a public switched telephony network (PSTN) and the digital data network. A signaling server is operatively coupled to the digital data network. A messaging server is also operatively coupled to the digital data network and is responsive to the signaling server. A media server, including computer data storage media for storing message files is also provided. A DTMF translator is interposed between to the gateway server and the media server to provide access to the message files stored on the media server using DTMF signals, such as from a standard telephone handset.

Also in accordance with the present invention is a method for providing messaging services in a data network telephony system. The method includes receiving a call request from a first user agent to a second user agent, where the user agents are telephony nodes or endpoints. In response to the call request, additional call requests are generated, generally by a signaling server, to both the second user agent and to a messaging server associated with the second user agent. In the event a message condition is detected, the method establishes a connection between the first user agent and a media server to provide message storage on the media server. If no message condition is detected, the call request to the messaging server is cancelled.

The message condition can be the expiration of a predetermined time period following the generation of the call request. The message condition can also be provided based on registration information or status information regarding the called party, such as a do not disturb indication, or a command or rule to forward certain calls to the messaging server.

The method also provides for call reclaiming. In this regard, when a calling party is recording a message on the media server, an invite request can be provided to the called party. If accepted, the called party can enter the call session and terminate the recording.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein:

FIG. 3 is an exemplary call programming language (CPL) script for selectively routing calls to a messaging server;

DETAILED DESCRIPTION OF THE INVENTION

Figure 1:
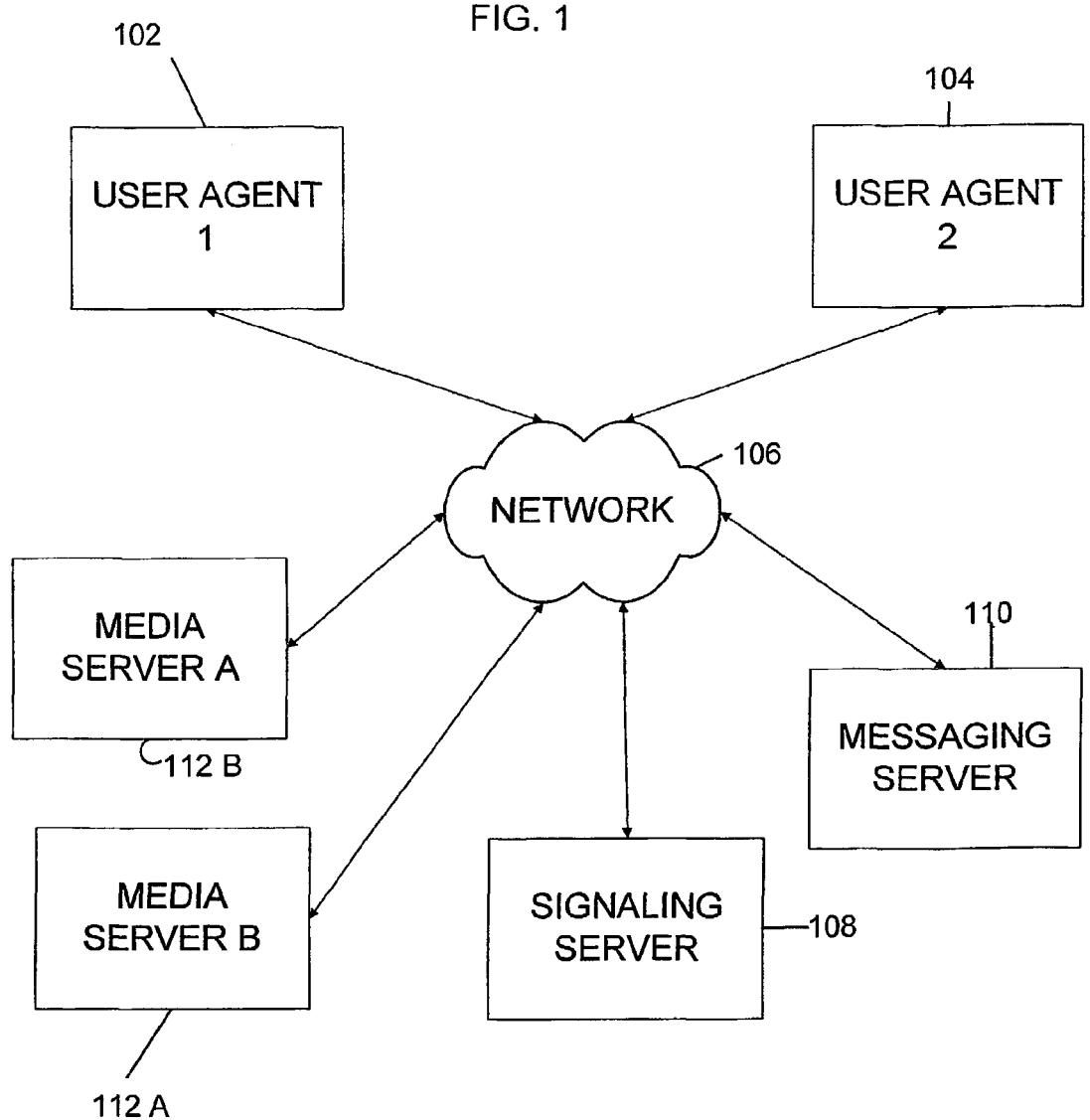
FIG. 1 is a block diagram of a system for providing unified messaging services in a SIP protocol telephony system.

FIG. 1 is a simplified block diagram illustrating the architecture of the present system for performing unified messaging services in connection with an Internet telephony system. The system as shown illustrates components which are part of a local telephony exchange or PBX. The system preferably operates in accordance with the session initiation protocol (SIP) for signaling and control functions. The system will generally include a large number of telephony endpoints, which preferably take the form of SIP protocol user agents. For illustrative purposes, only two such user agents 102, 104 are illustrated. The user agents 102, 104 can take on many forms, such as stand alone SIP telephony devices, which are available from a number of sources or SIP client software operating on a conventional personal computer, such as the SIPC software available for license from Columbia University, New York, N.Y. Suitable SIP user agents are described in international patent publication WO 00/76158 entitled "Network Telephony Appliance and System for Inter/Intranet Telephony" published on Dec. 14, 2000, which is hereby incorporated by reference in its entirety.

The SIP user agents 102, 104 are coupled to a network 106, such as an Ethernet network. The network can also be the Internet with user agents grouped under a common domain. The user agents 102, 104 can access one another directly via network 106 (internally, peer-to-peer), from a conventional telephony system via a SIP-PSTN gateway (externally) (FIG. 3), or externally from another internet domain.

The system generally includes a signaling server 108 which responds to call requests from a SIP user agent 102, 104 and identifies the location of the called party. Preferably, the signaling server 108 is a SIP server which can perform proxy and redirect signaling operations. In the SIP protocol, each telephony endpoint can be referred to as a node and has a specific SIP address. By employing this specific address, any node acting as a calling party can directly initiate a call session with any other node on the network. The signaling server 108 can be accessed by the various user agents 102, 104 on the network to provide enhanced services, such as a directory service, call forwarding, call branching, call messaging and the like. For example, a calling party wishing to initiate a call to JOHN SMITH can enter the SIP address for that person if it is known, such as sip: john.smith@work.com. If, on the other hand, the calling party does not know the SIP address of the party, the calling party can contact the signaling server 108 with a request to begin a session with JOHN SMITH.

The signaling server includes databases with registration information for various parties and can return the SIP address to the calling party or forward the call request to the proper SIP address of the called party. In addition, the called party may have multiple sip addresses such as john.smith@home, john.smith@office, john.smith@lab and the like. The signaling server can provide a session initiation signal to each of these addresses and establish a connection between the calling party and the first contacted node that responds to the initiation request. Similarly, parties can periodically register with the redirect server to indicate the current SIP address where they can be contacted (call forwarding feature). In general, when a call is initiated, the signaling server 108 either proxies, redirects or rejects the call initiation message. Signaling servers 108, such as SIP proxy servers are known. A suitable SIP proxy server can be implemented using the SIPD software available from Columbia University, New York, N.Y.

The system 100 also includes a messaging server 110 which is coupled to the signaling server 108 via the network 106. The messaging server 110 provides command and control functions with respect to the voice mail and other messaging features of the system 100. In the case of a system operating in accordance with the SIP protocol, the messaging server 110 includes a SIP address and operates in accordance with the protocol. In general, the messaging server 110 will be responsive to commands which are generated by the signaling server 108 in response to incoming calls or requests to access or manage messages.

In addition to the messaging server 110, at least one (two illustrated) separate media server 112 A, 112 B is also provided. In contrast to the messaging server 110 which provides control functionality, especially in regard to routing of calls, the media servers 112 A, 112 B primarily operate to provide prompts or outgoing messages to callers, to record messages, to provide notification of received messages and to provide for the retrieval of messages in various media formats. The storage of multimedia messages for a large number of users can involve large storage capacity and bandwidth. To distribute this system loading, multiple media servers 112 A, 112 B can be distributed throughout the system. The plurality of media servers 112 can be responsive to a single messaging server 110. Preferably, the media servers 112 support streaming media capability and protocols, such as the RTSP protocol.

As noted in connection with FIG. 1, the media servers are storage locations for the multimedia mails and messages. Multiple media servers 112 A and 112 B can be deployed within a given system (generally defined by a domain in SIP based systems) in order to distribute system loading and also provide for system scalability.

Message retrieval from the media servers 112 can take place in several ways. For example, a known RTSP based media player can be used to directly play recorded voice messages stored on the streaming media server 112A. For example a URI such as rtsp://rtsp.mediaserver.ext/user-agent_name/inbox/message_#.au can be used to retrieve the message identified as message_# from a user's inbox on the streaming media server identified by the term mediaserver-.ext. In addition, the user agent can have the message forwarded to her current location via e-mail. A preferred method of message retrieval is to provide access and management of a users inbox via a webpage using conventional web browser software, such as Netscape Navigator® or Microsoft Explorer®. This is illustrated and described below in connection with FIG. 4.

Figure 2:
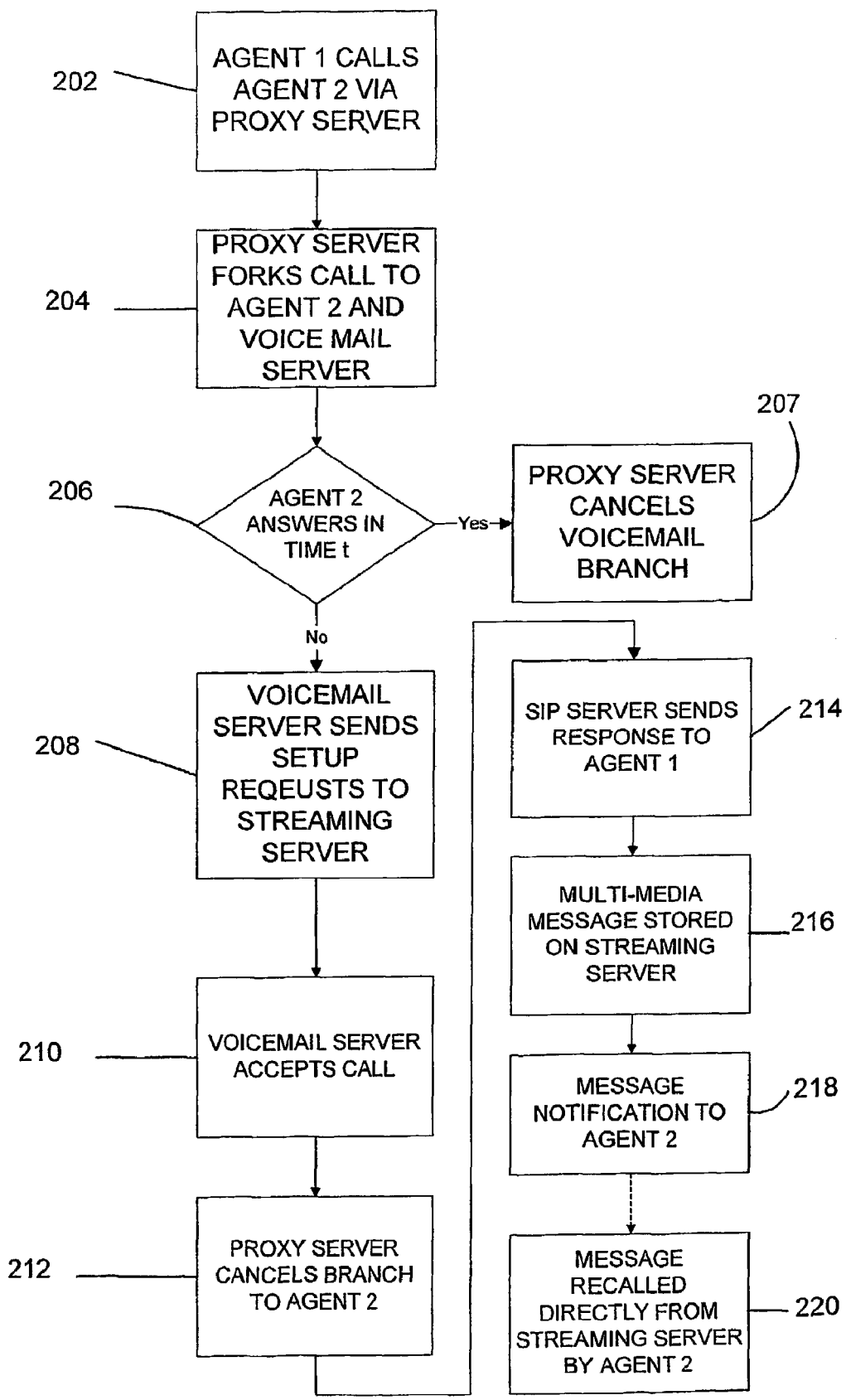
FIG. 2 is a flow chart describing an example of voice mail services being provided in accordance with the system of FIG. 1.

The operation of the system 100 of FIG. 1 will be described in connection with an exemplary call session set forth in the flow chart of FIG. 2. Referring to FIG. 2, SIP user agent 1 102 attempts to place a call to SIP user agent 2 104 (step 202). While the SIP protocol provides for direct peer-to-peer calls, it is assumed that the call is routed through the signaling server 108 via the network 106. The signaling server 108 generates a "forked proxy" by which a call request is routed to both the messaging server 110 as well as the current registered location of user agent 2 104 (step 204). The call request will result in the user agent 2 providing a ring or other notification of an incoming call request. If in step 206, the SIP user agent answers within a predetermined time, t, the proxy server 108 receives a signal that the call was accepted and cancels the call request that was sent to the voicemail server 110. The signaling server 108 then sends a response to user agent 1 102 to initiate the call session in a manner known in the art (step 207).

If in step 206 the user agent 2 104 does not provide a signal that the call was accepted within a predetermined time period t, such as ten seconds, a message condition occurs and the messaging server 110 generates a setup request an assigned media server 112 A (step 208). A message condition can also occur based on user agent preferences or availability. For example, a user agent may register with the signaling server 108 as unavailable to certain callers or at certain times of day. The setup request can include a request for playback of a welcome message and a separate request to record the an incoming voice mail message. Following the setup request to the media server 112 A, the messaging server 110 provides a signal to the proxy server 108 to accept the call (step 210). The signaling server 108 cancels the call request to user agent 2 104 (step 212) and provides a response to user agent 1 directing user agent 1 to the media server 112 A (step 214). Once routed to the media server 112 A, the operator of user agent 1 can be directed to leave a message by the media server providing a recorded greeting (step 216).

Upon completion of the message, the caller, user agent 1 102, terminates the call session and the signaling server 108 provides a signal to the media server 112 to stop recording. The messaging server 110 provides a notification, such as by e-mail, that a message has been received (step 218). Generally, the notification provides a link, such as a uniform resource locator (URL), directing the operator of SIP user agent 2 to the location on the media server where the message is stored. By providing such a link, rather than the message itself, the user can access the message remotely, such as by accessing the media server 112 via the Internet. In addition, by storing the message on the media server and providing a link to the message, system bandwidth and loading can be minimized. To recall the message, the user enters the link into an appropriate web browser and accesses the message stored on the media server 112 (step 220). Alternatively, the message can be packaged as an e-mail attachment and forwarded to the user.

As an alternative to the "forked proxy" approach to messaging described in connection with FIG. 2, redirection to the messaging server 110 can be programmed directly into the user agent receiving the call. Yet another alternative is the use of a script, such as the call processing language (CPL) script which is illustrated in FIG. 3. Such an approach provides the user with the most control over call routing. For example, a script can be written to selectively route calls to the messaging server 110 based on the time of day, the status of the user agent (i.e., busy), the caller address and the like. While the CPL script approach to routing offers the highest level of flexibility, messaging server 110 and signaling server 108 are required to support CPL to provide this enhanced functionality.

Figure 4:
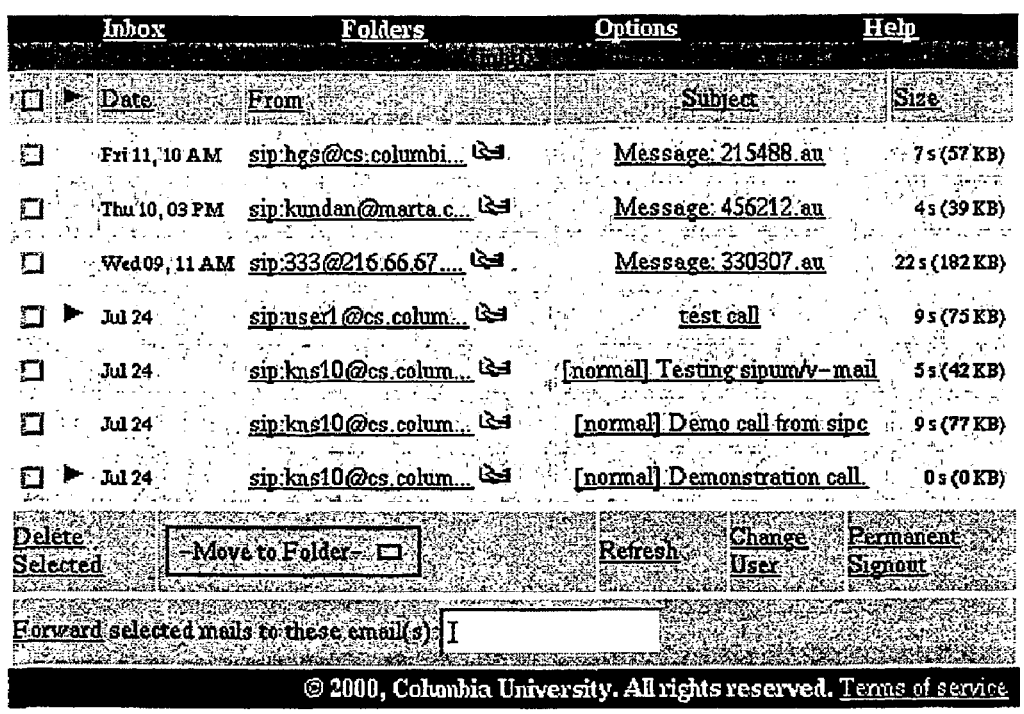
FIG. 4 is a pictorial representation of a user interface for a message management system suitable for use in connection with the present systems and methods.

FIG. 4 is an illustration of a user interface of a system for managing and retrieving messages stored on a media server. The mailbox management system generally organizes received messages in the form of user accessible folders, such as "inbox," "sent items," and the like in a manner which is commonly used in connection with e-mail management programs, such as Microsoft Outlook®. Referring to FIG. 4, each user can have a message inbox where multimedia messages can be stored including text, graphics, video and audio messages. The message management system will generally display received messages by date and sender and can display other information about the messages such as subject and message size. Within the subject, the type of message or a message type extension can be provided. Suitable unified message management software includes the SIPUM software, which is available from Columbia University, New York, N.Y.

Figure 5:
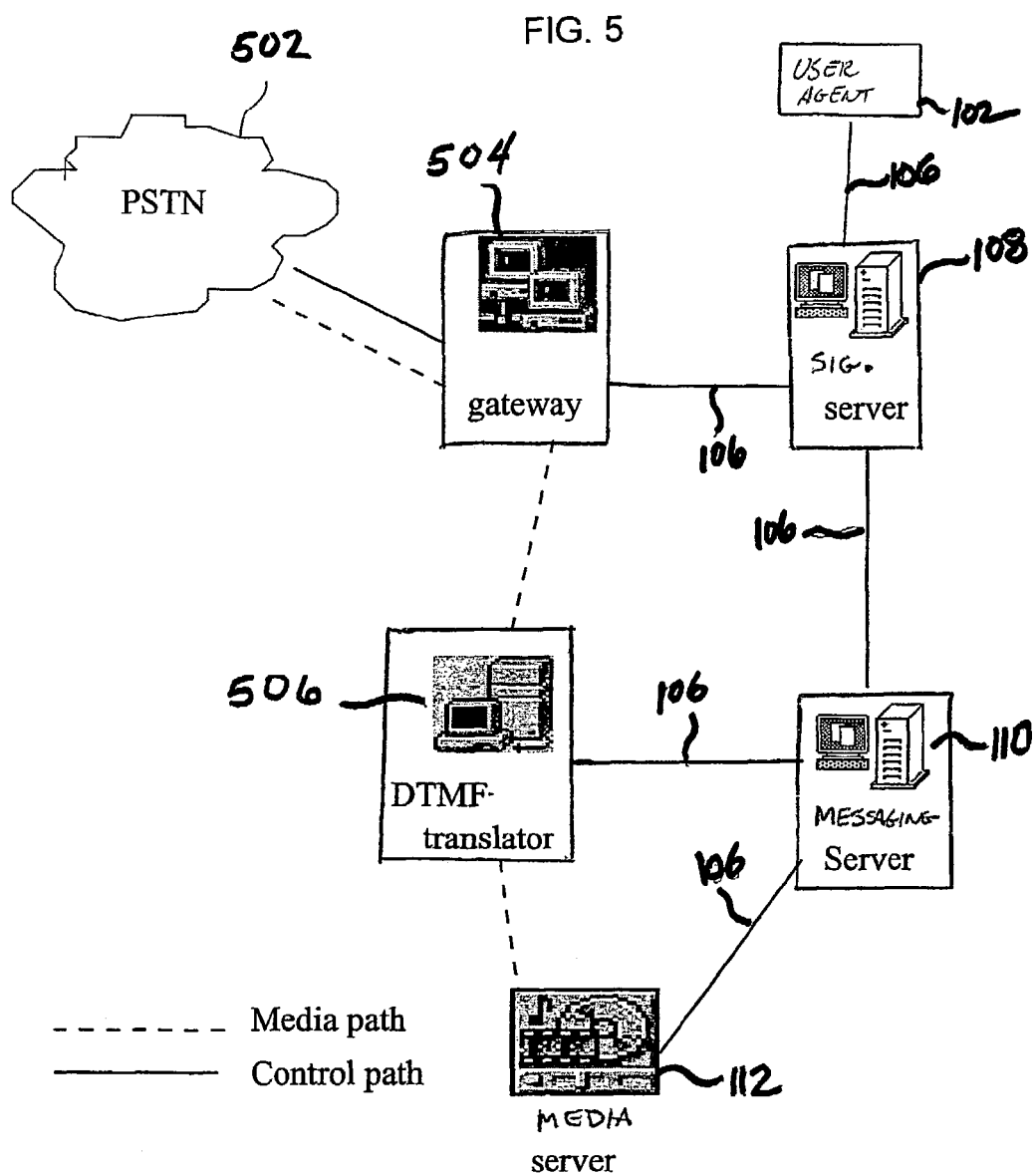
FIG. 5 is a block diagram of a system in accordance with the present invention including a gateway between an Internet telephony system and a conventional PSTN system.

FIG. 5 is a block diagram illustrating an extension of the system of FIG. 1 to conventional PSTN telephony systems. Telephony nodes, either traditional telephony endpoints or SIP user agents, operating outside the network 106 access the signaling server 108 via a SIP-PSTN gateway 504. The SIP-PSTN gateway 504 includes an interface to network 106 as well as an interface to the conventional PSTN system 502. Callers from the PSTN can place and receive calls to SIP user agents registered with the signaling server 108 via the SIP-PSTN gateway 504. The use of a SIP-PSTN gateway 504 between a SIP based telephony network and a traditional PSTN system is known in the art.

To provide access and control of the media servers 112, a DTMF-RTSP translator 406 is also provided. The SIP-PSTN gateway 508 preferably converts the DTMF tone signals into digital packet data, such as in the RTP protocol, for transport on the network 106. The RTP protocol packets are passed to the DTMF-RTSP translator 506 which receives the RTP encoded DTMF signaling tones from conventional telephony devices and provides corresponding commands in an RTSP protocol format which can be decoded by the media server 112. For example, a user of a conventional telephone handset within PSTN system 502 can access an inbox stored on the media server 112 and perform limited management functions using the keypad of the handset for numeric command entry. For example, the user can depress key #1 to hear new messages, key #4 to replay a message, key #7 to delete a message and key #9 to save a message, and the like. Of course, various commands can be assigned to various numeric entries and this set of commands is merely one such example.

An additional feature in the present system is call reclaiming. Call reclaiming refers to the ability of a called party to pick up a call after a message recording process has begun and provide the option of allowing the parties to terminate recording and initiate a normal call session. Referring back to FIG. 1, in the present architecture, message recording is remote from the user agent and, therefore, signaling methods must be in place to intervene in the recording process between a calling user agent and the media server 112. Several methods can be provided using the SIP protocol to achieve this. For example, after a call is routed to a media server 112 and the original call request to user agent 2 is cancelled, the media server can send an INVITE command to the user agent 2 104. If an operator of user agent 2 104 accepts the INVITE, user agent 2 can join a three way conference with the media server 112 and the calling party. This can be followed by the media server 112 generating a SIP BYE command to drop from the conference.

The present systems and methods provide a network telephony architecture for delivering unified messaging services. The use of media servers which are separate from the signaling servers provides enhanced system flexibility and scalability. In this way a common signaling server can operate with a number of media servers to optimize system loading and bandwidth considerations. The use of the SIP protocol provides an open architecture approach which tends to be "media neutral".

The invention has been described in connection with certain preferred embodiments thereof. It will be appreciated that those skilled in the art can modify or alter such embodiments without departing from the scope and spirit of the invention which is set forth in the appended claims.

The invention claimed is:

1. A network telephony system providing unified messaging services comprising:
   at least one user agent operatively coupled to a data network;
   a signaling server operatively coupled to the data network;
   a messaging server operatively coupled to the data network and responsive to the signaling server;
   a media server operatively coupled to the network, the media server including computer data storage media for storing message files, the media server being responsive to the messaging server and, on occurrence of a message condition, being directly accessible to a calling party to exchange a message file.

2. The network telephony system of claim 1, wherein the signaling server operates in accordance with the session initiation protocol.

3. The network telephony system of claim 1, wherein the signaling server further comprises a database of network addresses for registered user agents and wherein on receipt of a call request from a calling party, generates a call request to an address of the called user agent stored in the database and generates a call request to a network address of the messaging server.

4. The network telephony system of claim 3, wherein the signaling server cancels the call request to the messaging server in the event the call request to the called user agent is accepted.

5. The network telephony system of claim 3, wherein the signaling server cancels the call request to the called user agent in the event a message condition is detected.

6. The network telephony system of claim 5, wherein after a message condition is detected, an invite request is provided to the called user agent to reclaim the call from the media server.

7. The network telephony system of claim 5, wherein the media server provides a stored greeting message to the calling party in the event a message condition is detected.

8. The network telephony system of claim 7, wherein the greeting message is presented in a real time streaming media protocol.

9. The network telephony system of claim 1, further comprising a message management system for accessing message files stored on the media server.

10. The network telephony system of claim 1, wherein in response to a calling party storing a message on the media server, the media server provides a notification to a called party that a message is available.

11. The network telephony system of claim 10, wherein the notification includes a network address for accessing the message.

12. The network telephony system of claim 10, wherein the notification includes a copy of the message.

13. The network telephony system of claim 1, wherein the called user agent redirects a call to the messaging server on occurrence of a message condition.

14. A network telephony system, for operation with a data network, providing unified messaging services comprising:
    at least one user agent operatively coupled to a data network;
    a signaling server operatively coupled to the data network, the signaling server maintaining a registration database of network addresses of user agents;
    a messaging server operatively coupled to the data network and responsive to the signaling server;
    at least two media servers operatively coupled to the network, the at least two media servers being responsive to the messaging server, each media server including computer data storage media for storing and retrieving message files, the media servers being accessible to the at least one user agent to store, manage and retrieve message files.

15. The network telephony system of claim 14, wherein the signaling server operates in accordance with the session initiation protocol.

16. The network telephony system of claim 14, wherein the signaling server further comprises a database of network addresses for registered user agents and wherein on receipt of a call request from a calling party, generates a call request to an address of the called user agent stored in the database and generates a call request to a network address of the messaging server.

17. The network telephony system of claim 16, wherein the signaling server cancels the call request to the messaging server in the event the call request to the called user agent is accepted.

18. The network telephony system of claim 16, wherein the signaling server cancels the call request to the called user agent in the event a message condition is detected.

19. The network telephony system of claim 18, wherein after a message condition is detected, an invite request is provided to the called user agent to reclaim the call from the media server.

20. The network telephony system of claim 18, wherein the media server provides a stored greeting message to the calling party in the event a message condition is detected.

21. The network telephony system of claim 20, wherein the greeting message is presented in a real time streaming media protocol.

22. The network telephony system of claim 14, further comprising a message management system for accessing message files stored on the media server.

23. The network telephony system of claim 14, wherein in response to a calling party storing a message on the media server, the media server provides a notification to a called party that a message is available.

24. The network telephony system of claim 23, wherein the notification includes a network address for accessing the message.

25. The network telephony system of claim 23, wherein the notification includes a copy of the message.

26. The network telephony system of claim 14, wherein the called user agent redirects a call to the messaging server on occurrence of a message condition.

27. The network telephony system of claim 14, wherein the at least one user agent includes a first group of user agents and a second group of user agents, wherein the at least two media servers include at least first and second media servers and wherein the first group of user agents is associated with the first media server and the second group of user agents is associated with the second media server.

28. The network telephony system of claim 27, wherein the association between user agents and media servers is maintained by the messaging server.

29. A network telephony system including unified messaging services comprising:
   a digital data network;
   a gateway server computer interposed between a public switched telephony network (PSTN) and the digital data network;
   a signaling server operatively coupled to the digital data network;
   a messaging server operatively coupled to the digital data network and responsive to the signaling server;
   a media server, the media server being responsive to the messaging server, the media server including computer data storage media for storing message files; and
   a DTMF translator, the DTMF translator being interposed between to the gateway server and the media server.

30. The network telephony system of claim 29, wherein the signaling server operates in accordance with the session initiation protocol.

31. The network telephony system of claim 29, wherein the signaling server further comprises a database of network addresses for registered user agents and wherein on receipt of a call request from a calling party, generates a call request to an address of the called user agent stored in the database and generates a call request to a network address of the messaging server.

32. The network telephony system of claim 31, wherein the signaling server cancels the call request to the messaging server in the event the call request to the called user agent is accepted.

33. The network telephony system of claim 31, wherein the signaling server cancels the call request to the called user agent in the event a message condition is detected.

34. The network telephony system of claim 33, wherein after a message condition is detected, an invite request is provided to the called user agent to reclaim the call from the media server.

35. The network telephony system of claim 33, wherein the media server provides a stored greeting message to the calling party in the event a message condition is detected.

36. The network telephony system of claim 35, wherein the greeting message is presented in a real time streaming media protocol.

37. The network telephony system of claim 29, further comprising a message management system for accessing message files stored on the media server.

38. The network telephony system of claim 29, wherein in response to a calling party storing a message on the media server, the media server provides a notification to a called party that a message is available.

39. The network telephony system of claim 38, wherein the notification includes a network address for accessing the message.

40. The network telephony system of claim 38, wherein the notification includes a copy of the message.

41. The network telephony system of claim 29, wherein the called user agent redirects a call to the messaging server on occurrence of a message condition.

42. The network telephony system of claim 29, wherein the DTMF translator converts DTMF command signals provided by a user agent to equivalent command signals in a protocol compatible with the media server.

43. The network telephony system of claim 42, wherein the command signals provide direct access to the media server to enable message exchange with a user agent.

44. A method for providing messaging services in a data network telephony system, comprising:
   receiving a call request from a first user agent to a second user agent;
   generating a call request to an address for the second user agent and to a messaging server associated with the second user agent;
   establishing a connection between the first user agent and a media server in the event of a message condition to provide for message exchange with the media server;
   terminating the call request to the messaging server if no message condition occurs.

45. The method for providing messaging services in accordance with claim 44, wherein the message exchange further comprises recording a message from the first user agent and storing the message as a message file on the media server.

46. The method for providing messaging services in accordance with claim 44, wherein the message exchange further comprises providing a message file from the media server to the first user agent.

47. The method for providing messaging services in accordance with claim 44, further comprising providing a notification to the called party that a message is available.

48. The method for providing messaging services in accordance with claim 44, further comprising inviting the called party to reclaim the call while the first user agent is recording a message.

49. The method for providing messaging services in accordance with claim 44, wherein the message condition is the passage of a predetermined time period from the call request.

50. The method for providing messaging services in accordance with claim 44, wherein the message condition is an entry in a registration record associated with the called party.

51. The method for providing messaging services in accordance with claim 44, wherein the message condition is a response from the called party indicating the unavailability of the called party.

* * * * *